June 4, 1929.  C. G. OLSON  1,715,777
LOCK WASHER
Filed Feb. 4, 1927
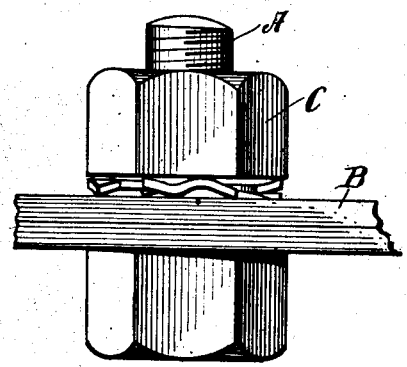
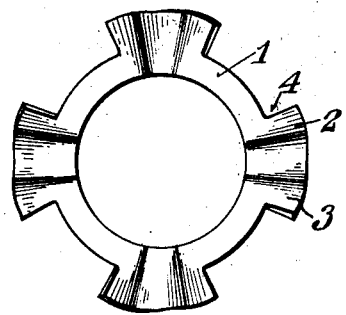
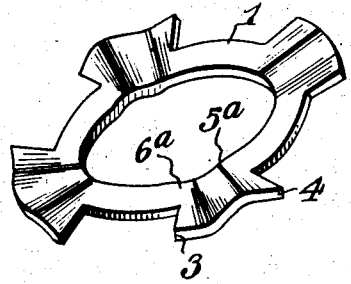
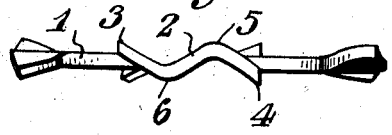
Inventor:
Carl G. Olson,
by George B Willcox
Atty.

Patented June 4, 1929.

1,715,777

UNITED STATES PATENT OFFICE.

CARL G. OLSON, OF CHICAGO, ILLINOIS, ASSIGNOR TO SHAKEPROOF LOCK WASHER COMPANY, INCORPORATED, DIVISION OF ILLINOIS TOOL WORKS, OF CHICAGO, ILLINOIS, A CORPORATION OF ILLINOIS.

LOCK WASHER.

Application filed February 4, 1927. Serial No. 165,828.

This invention relates to lock washers of the kind adapted for locking a nut or a bolt head to a substructure, the washer being made of flexible or spring material and provided with radially projecting teeth with radially disposed edges that bite into the bottom face or base of the nut and into the face of the substructure.

My improvement pertains more particularly to washers having yielding teeth, the biting edges of which are raised or sprung up out of the plane of the washer. In lock washers of this type the biting action is produced by the reactionary springing tendency of the tooth after having been partly flattened by compression between the nut and the substructure.

The object of my present improvement is to increase the biting effect of a washer of the kind above described, so that a washer of a given size may be greatly improved in working strength. To accomplish that result I do not merely offset the tooth to provide a biting edge, as heretofore, but in addition I correspondingly warp the annular ring of metal that forms the body of the washer and carries the radially projecting teeth or wings.

Heretofore washers of this character have usually been made either with a flat annular ring that comprises the body of the washer, and with axially twisted teeth or laterally warped wings that project therefrom, or else the washer has been made of an annular ring, itself formed with waves or undulations disposed radially, the raised ribs of the undulations having outwardly projecting teeth along their summits.

In my improved washer the radial edges of the outwardly projecting wings constitute the biting edges, as is usual, but the wings, instead of being individually warped by twisting to provide the required offset biting edge, are slightly corrugated and the undulations so formed extend inwardly in a radial direction across the annular ring that forms the body of the washer. Therefore, the compressive action of a nut tending to flatten the washer has to be forceful enough to overcome the normal resistance of the yielding spring tooth and in addition must partly compress the radial corrugations across the body of the washer. Conversely, when the nut tends to unscrew, the biting edge of the wing is driven into the face of the nut by a reaction force that comprises the sum of the force exerted by the yielding tooth plus the force exerted by the yielding corrugations that extend across the annular ring itself. By this means an effective washer is provided of equal gripping power, but capable of being made of lighter material than heretofore, because the ability of the teeth to bite into the work is greatly increased by reason of the waves or corrugations including both the tooth and the ring of the washer.

With the foregoing and certain other objects in view, which will appear later in the specifications, my invention comprises the devices described and claimed and the equivalents thereof.

In the drawings Fig. 1 is a side view of a bolt or nut and substructure with my washer applied thereto, ready to be compressed into locking position.

Fig. 2 is an enlarged plan view of the washer.

Fig. 3 is a perspective view.

Fig. 4 is a side view, showing the manner in which both the teeth or wings and the ring of the washer are together waved or corrugated radially.

As is clearly shown in the drawings, A indicates the bolt and B the substructure. C is the nut.

The washer comprises the usual annular ring 1 of sheet metal, provided with radially projecting wings 2 having their outer peripheries described by a circle concentric with ring 1. The biting edges of the wings are preferably radially disposed, as shown. The metal of one edge 3 of each wing is bent upwardly out of the plane of the washer, and the opposite edge 4 is bent downward. Each wing is corrugated radially, as shown in Fig. 4, and the corrugations extend from the tip or outer periphery of the wing inwardly across the ring 1 to the central hole of the washer, as is clearly shown in Fig. 2. The wavy shape given to the tooth and to the washer body by reason of such corrugating is generally that of a reverse curve. The biting edges 3 and 4 project slightly out of the normal plane of the washer, as also does the apex of each corrugation, as shown at 5 and 6. These upwardly projecting parts or ribs, which I term the apexes of the corrugations, extend, as above stated, from the outer rim of the wing to the inner periphery of the washer and are partly flattened by the base of the nut and the face of the substructure when the nut is tightened. Obviously the reactionary force tending to bite the teeth into the work when the nut tends to unscrew is equivalent to the combined springing efforts of the washer and of the wing, or about twice as great as the biting force of a twisted wing without the aid of the body corrugations.

The reverse curve may, if desired, be most pronounced at the outer periphery of the wings, as in Fig. 4, but decreasing in height and consequently fading inwardly, almost to zero, as at 5ª, 6ª, in Fig. 3.

It has been found in practice that this arrangement of corrugations provides a far greater gripping force than can be obtained either by merely twisting or warping the wing, or as heretofore, by providing teeth on the washer body at the apexes of the corrugations.

Having thus described my invention, what I claim and desire to secure by Letters Patent is:

1. A lock-washer comprising an annular ring of spring sheet metal, wing members projecting from the circumference thereof and spaced apart, each wing member formed with an upwardly and a downwardly projecting radially exposed rib in the shape of a reverse curve, said ribs extending from the outer periphery of the wing inward to the inner periphery of the ring, whereby said ribs are made to include both the wing and the ring and whereby both are adapted to react internally in ways to resist the external constraint, those parts of the ring between the wings being uncorrugated.

2. A lock-washer comprising an annular ring of sheet metal having radially projecting wing portions with radially disposed biting edges, said ring and wings formed with corrugations extending inwardly from the outer periphery of the wing where they are most pronounced, to the inner periphery of the ring where the corrugations are less pronounced, those parts of the ring between the wings being uncorrugated.

3. A lock washer comprising an annular ring of sheet metal, a plurality of projections on the periphery of said ring, each projection having a narrow portion and a wide portion, the wide portion formed circumferentially into wave-like reverse curves, the terminals and crests on the opposite faces thereof projecting outside of the side planes of the annular ring.

4. A lock washer comprising an annular ring of sheet metal, a plurality of projections on the periphery of said ring, said projections being narrowest at the root, where they are integrally attached to the ring, the wider radiating portion formed circumferentially into a wave-like reverse curve, causing the opposite terminals and crests of said wave-like curve to project out from the normal side planes of the washer.

In testimony whereof I affix my signature.

CARL G. OLSON.